United States Patent [19]
Ogino

[11] Patent Number: 5,235,580
[45] Date of Patent: Aug. 10, 1993

[54] OPTICAL INFORMATION RECORDING-REPRODUCING APPARATUS PROVIDED WITH A PLURALITY OF SAMPLE HOLD CIRCUITS

[75] Inventor: Yasuo Ogino, Yokohama, Japan

[73] Assignee: Canon Kabushiki Kaisha, Tokyo, Japan

[21] Appl. No.: 536,024

[22] Filed: Jun. 11, 1990

[30] Foreign Application Priority Data

Jun. 12, 1989 [JP] Japan .................................. 1-150059

[51] Int. Cl.[5] ............................................. G11B 20/10
[52] U.S. Cl. ............................. 369/44.32; 369/44.34; 369/54
[58] Field of Search ............... 369/44.32, 44.33, 44.34, 369/54

[56] References Cited

U.S. PATENT DOCUMENTS

| 4,785,442 | 11/1988 | Ohtake et al. | 369/44.32 |
| 4,805,163 | 2/1989 | Ohnuki | 369/44.32 |
| 4,821,251 | 4/1989 | Hosoya | 369/54 |
| 4,860,271 | 8/1989 | Yokogawa et al. | 369/44.34 |
| 4,872,152 | 10/1989 | Tsuyoshi et al. | 369/44.34 |
| 4,982,392 | 1/1991 | Soejima | 369/44.33 |
| 4,982,394 | 1/1991 | Kanda et al. | 369/44.32 |
| 5,027,338 | 6/1991 | Ata | 369/44.32 |

FOREIGN PATENT DOCUMENTS 0227445 7/1987 European Pat. Off. .
0306179 3/1989 European Pat. Off. .

Primary Examiner—Roy N. Envall, Jr.
Assistant Examiner—Jennifer L. Hazard
Attorney, Agent, or Firm—Fitzpatrick, Cella, Harper & Scinto

[57] ABSTRACT

An optical information recording-reproducing apparatus includes a scanning device for scanning a recording medium by a light beam and effecting the recording and/or reproduction of information, controller for effecting the auto focusing control and/or the auto tracking control of the light beam, an error signal detecting circuit for detecting an error signal for driving the controller, a plurality of sample hold circuits for periodically sampling the error signal at different times, an abnormality detecting circuit for detecting an abnormality of in the behavior of the error signal, a circuit for discontinuing the sampling when the sampling starting time of the sample hold circuits comes within a period during which the abnormality is being detected by the abnormality detecting circuit, a selecting circuit for selecting one of the plurality of sample hold circuits and supplying the output of the selected circuit to the controller, and an instructing circuit for instructing the selecting circuit to select the other sample hold circuit when an abnormality is detected by the abnormality detecting circuit during the sampling period of the selected sample hold circuit.

12 Claims, 9 Drawing Sheets

OPTICAL INFORMATION RECORDING-REPRODUCING APPARATUS PROVIDED WITH A PLURALITY OF SAMPLE HOLD CIRCUITS

BACKGROUND OF THE INVENTION

1. Field of the Invention

This invention relates to an apparatus such as a compact disk player, an optical disk apparatus or an optical card apparatus for scanning a recording medium with a condensed light beam while effecting auto focusing control and/or auto tracking control, thereby accomplishing recording and/or reproduction of information.

2. Description of the Related Art

In an information recording-reproducing apparatus for recording information on a recording medium and reading out the information recorded on the recording medium, auto focusing (hereinafter referred to as AF) control for condensing and controlling a recording-reproducing laser beam projected on the surface of the recording medium and auto tracking (hereinafter referred to as AT) control for position-controlling a condensed laser beam spot, to follow tracks formed on the surface of the recording medium have heretofore been effected.

On the other hand, in such AF control or AT control, the presence of an abnormality such as dust or flaws on the recording medium has sometimes caused the control operation to exceed a predetermined tolerance (so-called AF failure or AT failure). Therefore, there have been proposed various methods of preventing such a condition. The basic concept of such prior-art methods will hereinafter be described with reference to FIGS. 1 to 4 of the accompanying drawings. Here, a three-beam method and an astigmatism method will first be described as a popular AT and AF control method, and then the prior-art method of preventing AT failure will be described with AT control taken as an example.

FIG. 1 is a perspective view schematically showing the construction of an optical information recording-reproducing apparatus. FIG. 2 is a block diagram showing the construction of a photodetector shown in FIG. 1 and a circuit for producing an AF/AT control signal.

In FIG. 1, reference numeral 47 designates a semiconductor laser which is a light source, reference numeral 48 denotes a collimator lens, reference numeral 49 designates a light beam shaping prism, reference numeral 50 denotes a diffraction grating for dividing a light beam, reference numeral 40 designates a beam splitter, reference numeral 45 denotes a reflecting prism, reference numeral 46 designates an objective lens, reference numeral 41 denotes an astigmatism condensing lens system, and reference numerals 42-44 designate photodetectors.

A light beam emitted from the semiconductor laser 47 becomes a divergent light beam and enters the collimator lens 48, by which it is made into a parallel light beam. This parallel light beam is shaped into a predetermined light intensity distribution by the light beam shaping prism 49, whereafter it enters the diffraction grating 50, by which it is divided into three light beams (0-order diffracted light and ±1st-order diffracted lights). These three light beams enter and rectilinearly pass through the beam splitter 40, and are further reflected by the reflecting prism 45 and enter the objective lens 46, and pass therethrough, whereby they are condensed and form three light beam spots S1 (corresponding to +1st-order diffracted light), S2 (corresponding to 0-order diffracted light) and S3 (corresponding to −1st-order diffracted light) on a recording medium 51.

The light beam spots S1 and S3 are positioned on adjacent tracking tracks $52_1$ and $52_2$, respectively, formed on the recording medium 51, and the light beam spot S2 is positioned on an information track 53 between the tracking tracks. The medium 51 is driven in the direction of arrow X by a motor, not shown. Recording or reproduction of information is effected on the information track 53 by the spot S2.

The reflected lights from the light beam spots S1, S2 and S3 formed on the recording medium pass through the objective lens 46 and are thereby made into substantially parallel light beams, and are reflected by the reflecting prism 45. Of these reflected lights, the reflected light from the light beam spot S2 enters the four-division photodetector 43. Also, the reflected lights from the light beam spots S1 and S3 enter the photodetectors 42 and 44, respectively.

As shown in FIG. 2, an AF control system 61 is designed to add the photocurrent outputs $I_A$, $I_B$, $I_C$ and $I_D$ of the divided elements A, B, C and D, respectively, of the four-division photodetector 43 as indicated by $(I_A+I_D)$ and $(I_B+I_C)$, and to output the difference between the added values as an output V1 for AF control.

Also, an AT control system 62 is designed to output the difference between the photocurrent outputs of the photodetectors 42 and 44 as an output V2 for AT control.

An information reproducing system 60 is designed to output the sum total of the outputs of the divided elements A, B, C and D of the aforementioned four-division photodetector 43 as an output V3 for information reproduction.

That is, in the AF control system 61, when the light beam spot S2 is focused on the information track and forms the smallest spot thereon (i.e., during in-focus), it is projected as a circular spot onto the four-division photodetector 43, and substantially equal quantities of light enter the divided elements A, B, C and D and the output V1 for AF control becomes substantially zero. Also, during an out-of-focus state, the light beam spot S2 is projected as an elliptical spot onto the four-division photodetector 43 by the astigmatism condensing lens system 41, and the output V1 for AF control varies as shown in FIG. 3A. The horizontal axis of the graph of FIG. 3A represents the distance between the lens 46 and the recording medium.

On the other hand, in the AT control system 62, when the light beam spots S1 and S3 are uniformly positioned on the corresponding tracking tracks (that is, when the spot S2 is applied to right above the information track), substantially equal quantities of light enter the photodetectors 42 and 44 and the output V2 for AT control becomes substantially zero. Also, when the spot S2 deviates from the center of the information track, the signal V2 for AT control varies correspondingly to the difference between the quantities of reflected light from the spots S1 and S3, as shown in FIG. 3B. The horizontal axis of FIG. 3B represents the distance of the beam spot S2 from the center of the information track in a direction perpendicular to the track indicated by arrow Y.

The AF and AT control systems independently drive AF and AT actuators, respectively, not shown, so that the outputs V1 and V2 for control of the respective systems may become less than a predetermined allowable value or substantially zero, and control the position of the objective lens relative to the recording medium.

An example of the AT control and AF control systems in a state in which there is no impediment such as dust or a flaw on the recording medium has been described above.

A description will hereinafter be provided of a heretofore proposed system for preventing AF failure and AT failure in a state in which there is an impediment such as dust or a flaw on the recording medium.

FIG. 4 is a block diagram of a prior-art circuit for preventing AT failure. A control signal input from a terminal 63 is a signal which exhibits the same behavior as the aforedescribed signal V2 for AT control, and this signal for AT control (hereinafter referred to as the AT error signal) is input to an AT abnormality detecting circuit 64 and a sample hold circuit 65 for sampling and holding the AT error signal in accordance with the output signal of the AT abnormality detecting circuit 64.

Now, when there is no impediment which will cause AT failure, the absolute value of the AT error signal level is a predetermined value or less. The AT abnormality detecting circuit 64 detects by a window comparator, not shown, that the signal level is the predetermined value or less, and causes the sample hold circuit 65 to assume its sampling condition. On the other hand, when there is any impediment which will cause AT failure, the absolute value of the AT error signal level exceeds the predetermined value, and the AT abnormality detecting circuit 64 detects the abnormality of AT by the window comparator, not shown, and opens the switch of the sample hold circuit 65 to cause this circuit to assume its holding condition. This holding condition is released after the lapse of a predetermined time or at a point of time at which the aforementioned impediment has passed, and the sample hold circuit restores its sampling condition.

Also, in the AF failure preventing method, use is made of a circuit of the same construction as that of FIG. 4, and the aforementioned signal V1 for AF control is input from the terminal 63. This signal for AF control (hereinafter referred to as the AF error signal) is input to the AF abnormality detecting circuit 64 and the sample hold circuit 65 for sampling and holding the AF error signal in accordance with the output signal of the AF abnormality circuit 64, and the same operation as that in the AT failure preventing system is performed.

In the prior-art system, by the above-described operation, any impediment is detected, and only during a time in which there is the impediment, a control signal before the occurrence of the impediment is output in a false fashion, thereby minimizing the influence imparted to the control system by the impediment.

However, in the prior art described above, the AF error signal and/or the AT error signal is held at a point in time at which an impediment such as dust or a flaw on the recording medium has been detected and thus, the AF and/or AT actuator is controlled by a signal which has already exceeded an allowable predetermined value, and this has led to the problem that accurate control cannot be accomplished.

SUMMARY OF THE INVENTION

It is the object of the present invention to solve the above-noted problem peculiar to the prior art and to provide an optical information recording-reproducing apparatus capable of accomplishing highly accurate control without causing AF and AT failure even when any impediment such as dust or flaw occurs on a recording medium.

The above object of the present invention is achieved by an optical information recording-reproducing apparatus comprising:

means for scanning a recording medium with a light beam and effecting the recording and/or reproduction of information;

control means for effecting the auto focusing control and/or the auto tracking control of the light beam;

an error signal detecting circuit for detecting an error signal for driving the control means;

a plurality of sample hold circuits for periodically sampling the error signal at different times;

an abnormality detecting circuit for detecting an abnormality in the behavior in the error signal;

a circuit for discontinuing the sampling when the sampling starting time of the sample hold circuits occurs within a period during which the abnormality is being detected by the abnormality detecting circuit;

a selecting circuit for selecting one of the plurality of sample hold circuits and supplying the output of the selected circuit to the control means; and an instructing circuit for instructing the selecting circuit to select other sample hold circuit when the abnormality is detected by the abnormality detecting circuit during the sampling period of the selected sample hold circuit.

DESCRIPTION OF THE PREFERRED EMBODIMENT

Figure 1:
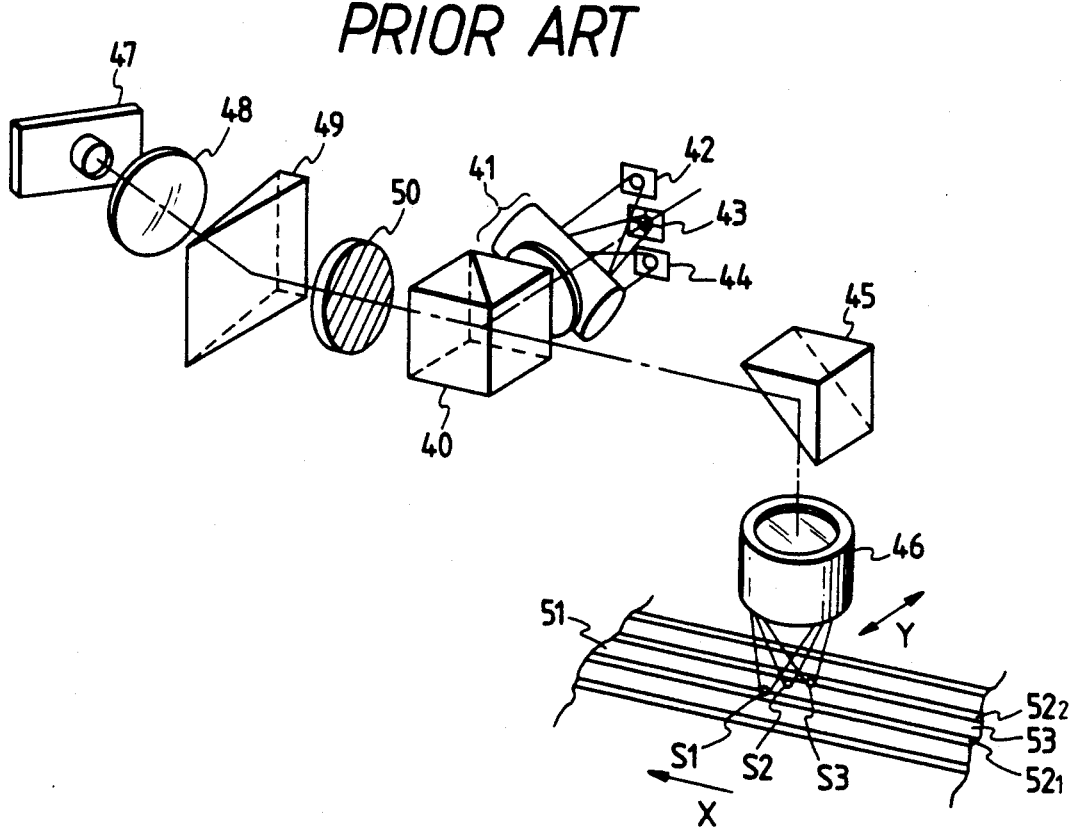
FIG. 1 is a schematic perspective view showing the construction of an optical information recording-reproducing apparatus.
Figure 2:
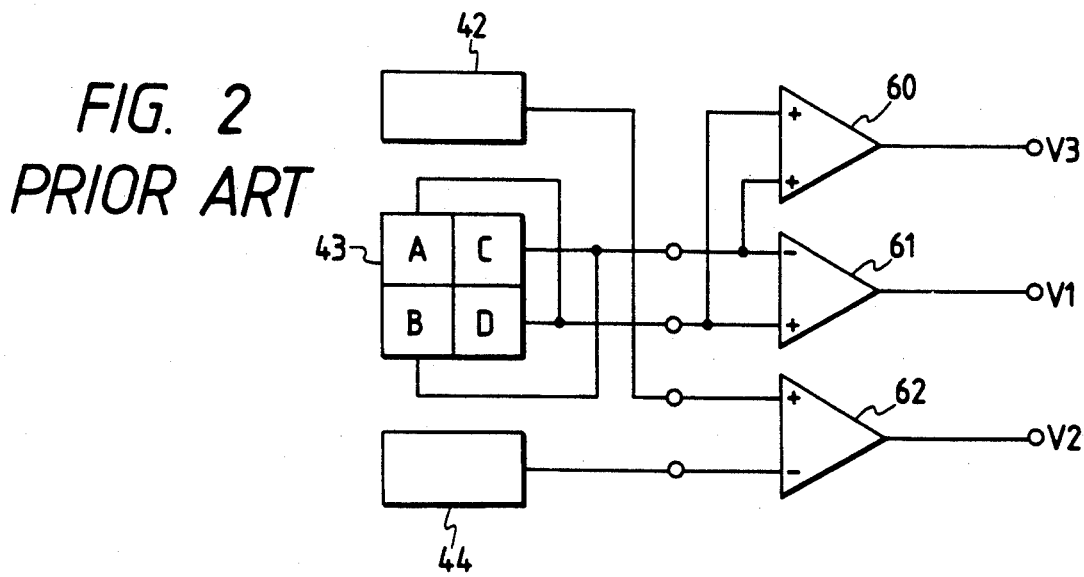
FIG. 2 diagrammatically shows a detecting circuit for detecting AF and AT error signals.
Figure 3A:
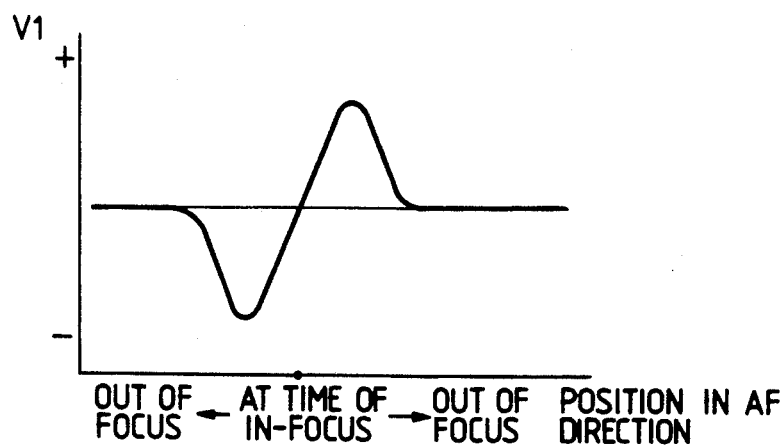
FIGS. 3A and 3B show the AF and AT error signals, respectively.
Figure 3B:
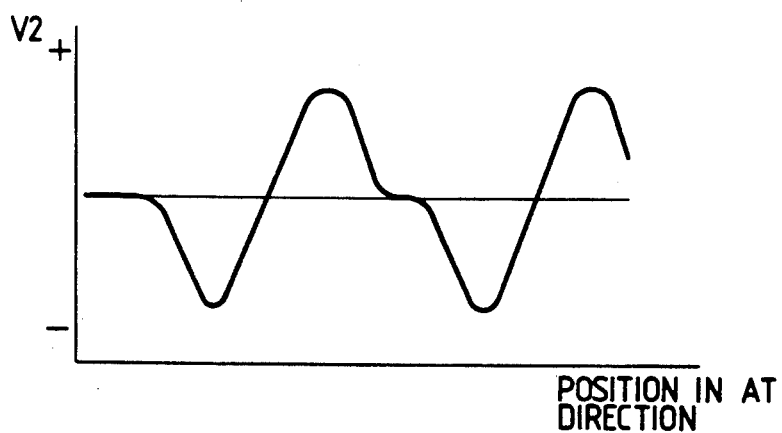
Figure 4:
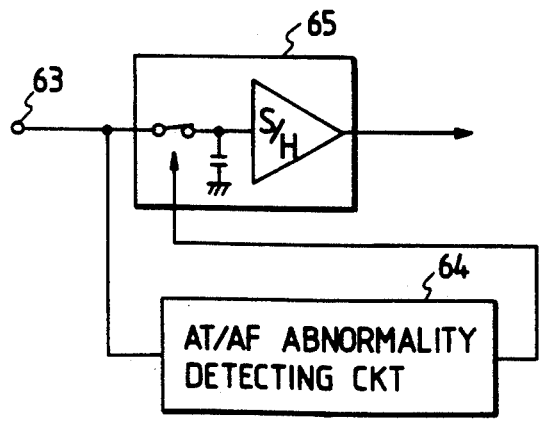
FIG. 4 is a block diagram of an example of the AT failure preventing circuit according to the prior art.
Figure 5:
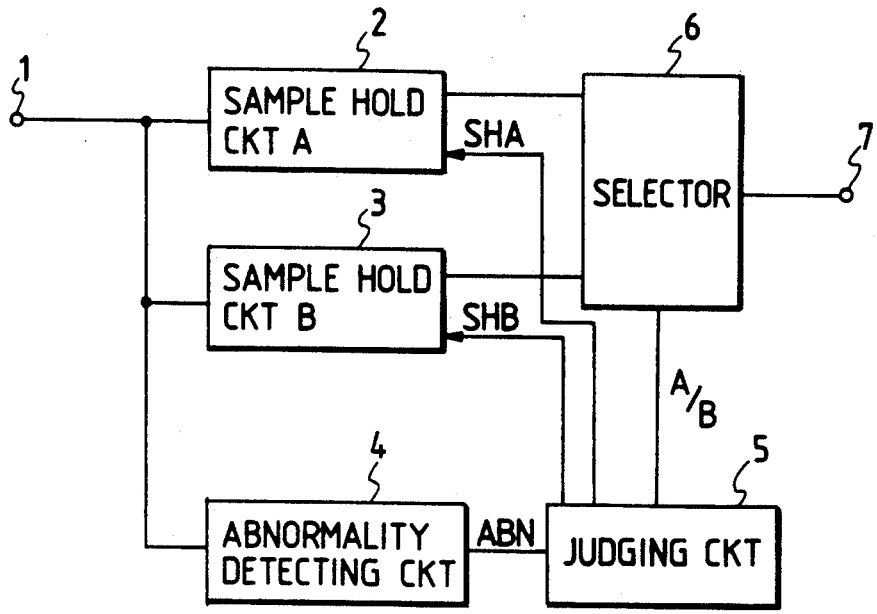
FIG. 5 is a block diagram showing an embodiment of a control circuit used in the apparatus of the present invention.
Figure 6:
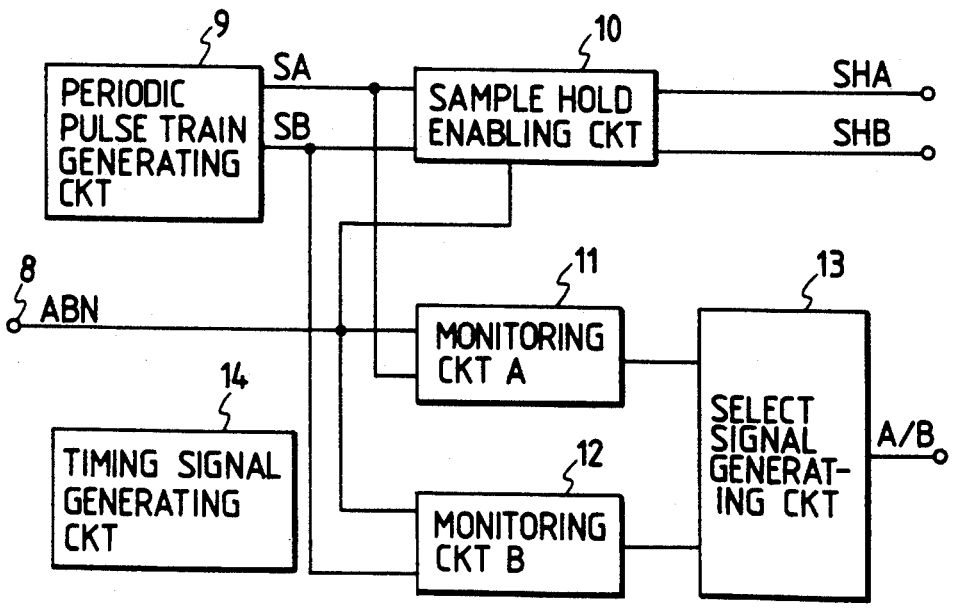
FIG. 6 is a block diagram showing the construction of a determining circuit shown in FIG. 5.
Figure 7:
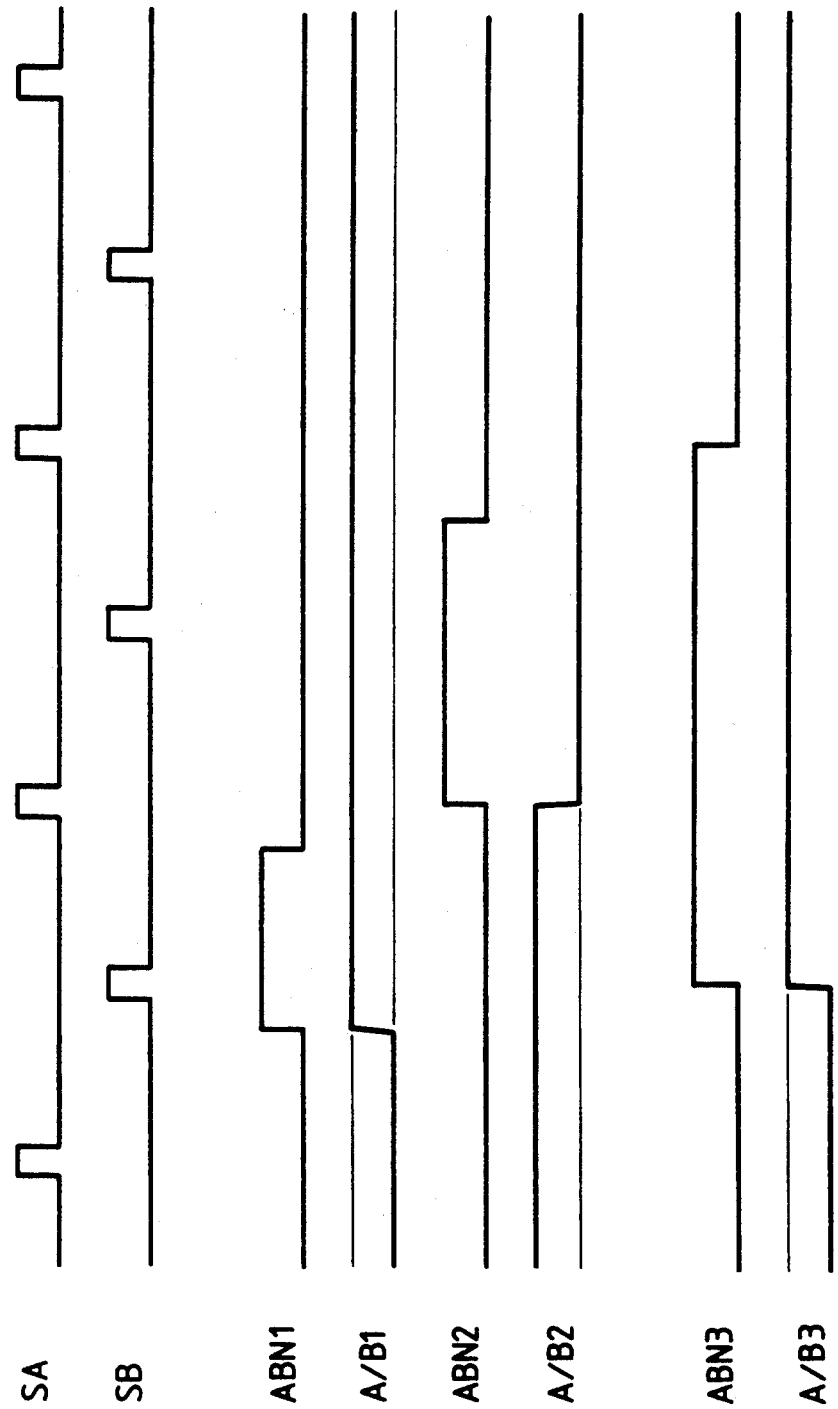
FIG. 7 is a timing chart showing signal waveforms in the various portions shown in FIG. 6.

FIG. 5 is a block diagram showing an embodiment of a control circuit used in the optical information recording-reproducing apparatus of the present invention. In the apparatus of the present invention, the construction for detecting an AF and/or AT error signal and effecting the recording and/or reproduction of information may be a construction entirely similar to that described with reference to FIGS. 1 and 2. Accordingly, herein, the description of the entire construction of the apparatus is omitted, and a description will be provided of a circuit which is a characteristic portion of the present invention for processing detected error signals and outputting them toward an actuator. FIG. 6 is a block diagram showing the construction of a judging circuit shown in FIG. 5, and FIG. 7 is a timing chart showing signal waveforms in the various portions of the circuit shown in FIG. 6.

In FIG. 5, the reference numeral 1 designates an input terminal for inputting an error signal, the reference numeral 2 denotes a sample hold (hereinafter referred to as S/H) circuit A to which the error signal is input, and the reference numeral 3 designates a sample hold (S/H) circuit B to which the same signal to that to the circuit 2 is input. The reference numeral 4 denotes an abnormality detecting circuit for the error signal to which the same signal as that to the circuits 2 and 3 is input. As in the prior art, when during the operation of a control system, the error signal assumes a level outside a predetermined allowable range, the abnormality detecting circuit 4 outputs an abnormality detection signal ABN (hereinafter referred to as the ABN signal) indicative of this fact, for example, by a window comparator, not shown. The reference numeral 5 designates a judging circuit to which the ABN signal is input. This judging circuit 5 outputs a signal for controlling the sampling and holding operation of the S/H circuit A (hereinafter referred to as the SHA signal) and a signal for controlling the sampling and holding operation of the S/H circuit B (hereinafter referred to as the SHB signal), and outputs a selection signal indicating the output of the S/H circuit A and the S/H circuit B which should be selected (hereinafter referred to as the A/B signal). The reference numeral 6 denotes a selector for selecting the output of one of the S/H circuit A and the S/H circuit B by the A/B signal. The reference numeral 7 designates an output terminal for outputting the selected signal. The output terminal 7 is connected to drive means such as AT and AF actuators, not shown.

In FIG. 6, the reference numeral 8 denotes an input terminal for inputting the aforementioned ABN signal, and the reference numeral 9 designates a periodic pulse train generating circuit generating periodic pulse trains SA and SB differing in phase from each other. The reference numeral 10 denotes an S/H enabling circuit to which the periodic pulse trains SA and SB are input and also to which the ABN signal is input. This S/H enabling circuit 10 outputs the SHA signal and the SHB signal.

The reference numeral 11 designates a monitoring circuit A to which the ABN signal and the periodic pulse train SA are input and which detects when an abnormality of the error signal occurs or terminates, for the operative state of the S/H circuit A, and the reference numeral 12 denotes a monitoring circuit B to which the ABN signal and the periodic pulse train SB are input and which detects when an abnormality of the error signal occurs or terminates for the operative state of the S/H circuit B. The reference numeral 13 designates a select signal generating circuit generating an A/B signal indicating which of the S/H circuit A 2 and the S/H circuit B 3 should be selected by signals output from the monitoring circuit A 11 and the monitoring circuit B 12.

FIG. 7 is a timing chart schematically showing the operation of the present invention. In FIG. 7, SA and SB are the aforementioned periodic pulse trains differing in phase from each other, and when there is no abnormality in the error signal, the sampling operation of the sample hold circuits is executed in a time section corresponding to the "High" (hereinafter shown as "H") level of each periodic pulse train. Also, the holding operation is executed in a time section corresponding to the "Low" (hereinafter shown as "L") level of each periodic pulse train.

ABN1, ABN2 and ABN3 show the representative forms of the ABN signal output by the abnormality detecting circuit 4 of FIG. 5 which has detected an abnormality in the error signal, and they differ in the timing of the generation and the termination of the periodic pulse trains SA and SB from one another. A/B1, A/B2 and A/B3 are selection signals in the respective forms.

In the present embodiment, when a state in which no abnormality of the AT and/or AF control is found continues, the magnitude of the error signal is within a predetermined allowable range and therefore, the abnormality detecting circuit 4 outputs a signal ABN of the "L" level. Also, in the judging circuit 5, the signal ABN is at the "L" level and therefore, the monitoring circuit A 11 and the monitoring circuit B 12 do not effect the change-over of the S/H portion, and the signal A/B continues to keep the "H" level or the "L" level. Further, in the judging circuit 5, the periodic pulse trains SA and SB differing in phase from each other are output as sample hold signals SHA and SHB, respectively, without being limited by the S/H enabling circuit 10. In the S/H circuit A 2, the signal SHA is input, and the error signal is sampled during the period of the "H" level and is held during the period of the "L" level. Also in the S/H circuit B 3, the signal SHB is likewise input, and the error signal is sampled during the period of the "H"level and is held during the period of the "L" level. Further, in the selector 6, the S/H output of the side selected by the polarity of the signal A/B is output from the output terminal 7.

A case where an abnormality is detected in the error signal will hereinafter be described chiefly with respect to the judging circuit 5.

In the first example shown in FIG. 7, the abnormality detection signal ABN1 is generated during the holding period of the S/H circuit A 2 and terminates during the same holding period. In this case, in FIG. 6, the monitoring circuit A 11 does not change over the S/H circuit because the signal ABN1 is generated and terminates during the holding period of the S/H circuit 2. Also, the monitoring circuit B 12 remains inoperative although it detects the "H" level of the periodic pulse train SB during the generation of the signal ABN1. In the present embodiment, the monitoring circuit A 11 and the monitoring circuit B 12 chiefly monitor whether the abnormality detection signal ABN1 is generated and/or terminates when the periodic pulse trains SA and SB are in the "H" level state. Now, in the first example, the S/H enabling circuit 10 does not allow the passage of the periodic pulse train SB (the first pulse of FIG. 7) generated from the periodic pulse train generating circuit 9 when the signal ABN is being generated and therefore, in the S/H circuit B 3, sampling is not effected during this time, but the holding of the value sampled before an abnormality occurs in the error signal is continued. Accordingly, in the first example, the monitoring circuit A 11 and the monitoring circuit B 12 hold the value before the occurrence of an abnormality irrespective of the occurrence and termination of the abnormality of the error signal. Also, as regards the signal A/B generated from the select signal generating circuit 13, the S/H circuit selected before the abnormality remains selected.

Next, in the second example, the signal ABN2 is such that an abnormality occurs in the error signal when the periodic pulse train SA is at the "H" level, i.e., when the S/H circuit A 2 is sampling, and terminates during the original holding period. In this case, the monitoring circuit A 11 detects that the abnormality detection signal ABN2 has been generated when the periodic pulse train SA is in the "H" level state. Then, it confirms that the S/H circuit B 3 has sampled a normal error signal, and outputs such to the select signal generating circuit 13. A demand signal for driving an actuator, not shown, is output from the S/H circuit B 3. In response to this, the select signal generating circuit 13 immediately renders the signal A/B 2 into the "L" level. Further, the S/H enabling circuit 10 does not allow the passage of the periodic pulse train SB (the second pulse of FIG. 7) subsequently generated. That is, it discontinues the sampling operation of the S/H circuit B during the "H" level period of the signal ABN2. Also, the monitoring circuit B 11 remains inoperative during this time, and a demand signal for selecting the output of the S/H circuit A is not generated.

Next, in the third example, as regards the signal ABN3, an abnormality occurs when the periodic pulse train SB is at the "H" level, that is, when the S/H circuit B is sampling, and the abnormality of the error signal terminates when the periodic pulse train SA is at the "H" level, that is, when the S/H circuit A is sampling. In this case, the monitoring circuit B 12 detects that the abnormality detection signal ABN3 has been generated when the periodic pulse train SB is in the "H" level state. Then, it confirms that the S/H circuit A 2 which has sampled a normal error signal, and outputs to the select signal generating circuit 13 a demand signal for selecting the output of the S/H circuit A 2. The select signal generating circuit 13 immediately renders the signal A/B into the "H" level. Further, the S/H enabling circuit 10 does not allow the passage of the subsequent periodic pulse train SA (the second pulse of FIG. 7) and periodic pulse train SB (the second and third pulses of FIG. 7) and discontinues the sampling operation of the S/H circuit A and the S/H circuit B during the period when the abnormality detection signal ABN3 is at the "H" level. Further, the monitoring circuit A 11 detects that the signal ABN3 assumes the "L" level, that is, the abnormality of the error signal has terminated (for example, due to its having passed the region of dust, a flaw in the recording medium or the like), when the periodic pulse train SA (the third pulse of FIG. 7) subsequently generated is in the "H" level state, but becomes inoperative because the S/H circuit B 3 is not performing the sampling operation during the time of the periodic pulse train SB (the second pulse of FIG. 7) immediately before.

Figure 8:
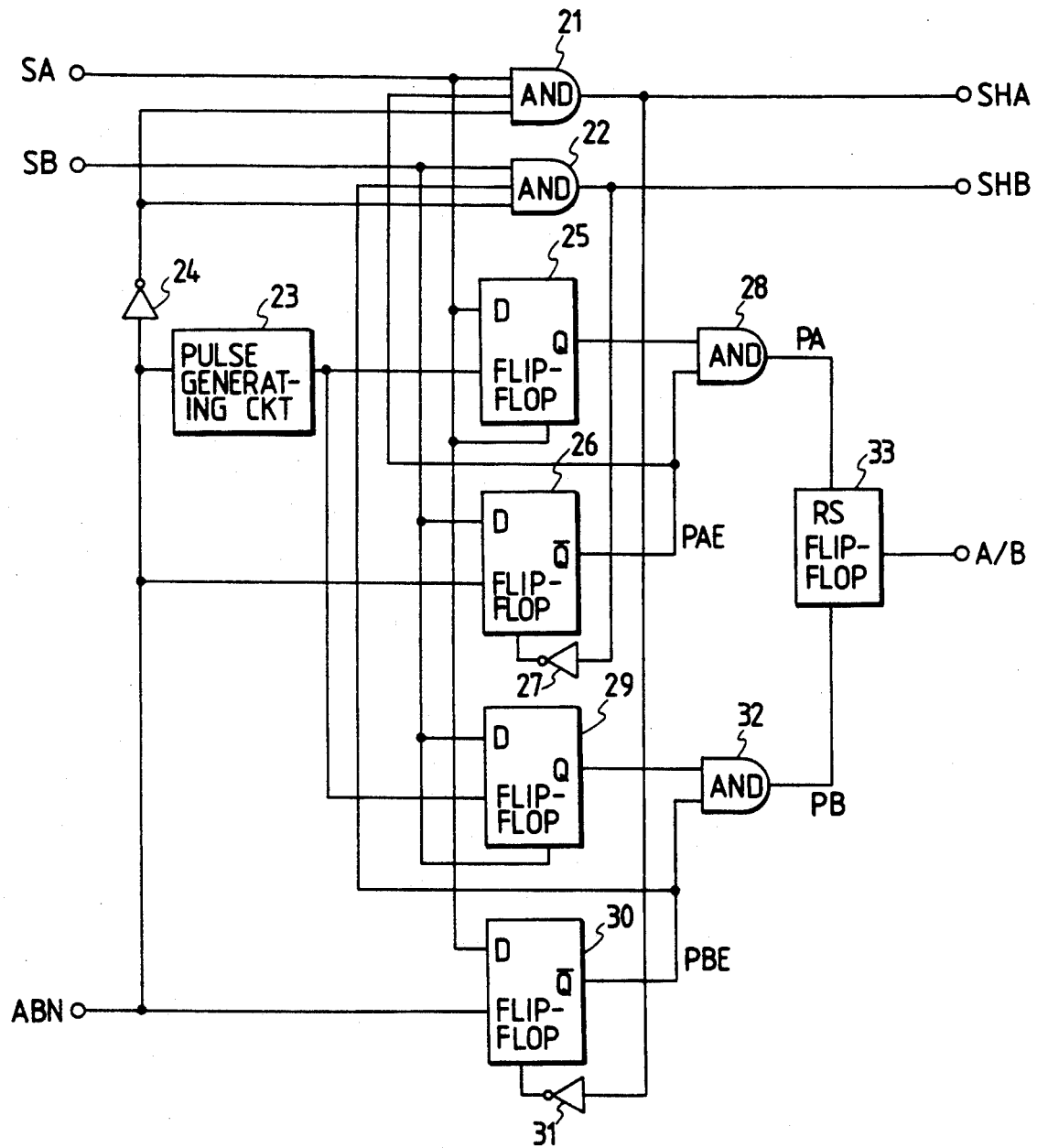
FIG. 8 is a circuit diagram showing a specific example of the determining circuit shown in FIG. 6.

The present invention will be described in greater detail with reference to FIGS. 8 to 11. FIG. 8 is a circuit diagram showing a specific example of the judging circuit shown in FIG. 6. In FIG. 8, the reference numeral 21 designates a three-input AND circuit for gating the periodic pulse train SA by the inverted signal (hereinafter referred to as $\overline{ABN}$) of the signal ABN or the output of a D-type flip-flop 26 which will be described later. The AND circuit 21 outputs a signal SHA.

The reference numeral 22 denotes a three-input AND circuit for gating the periodic pulse train SB by the signal $\overline{ABN}$ or the output of a D-type flip-flop 30 which will be described later. The AND circuit 22 outputs a signal SHB.

The reference numeral 23 designates a pulse generating circuit to which the signal ABN is input and which generates a pulse at a timing corresponding to the occurrence of an abnormality in the error signal (the rising of the signal) and the termination of the abnormality (the falling of the signal), and the reference numeral 24 denotes an inverter for converting the signal ABN into a signal of the opposite polarity.

The reference numeral 25 designates a D-type flip-flop, the D terminal, and the clear terminal of which receive the periodic pulse train SA and the clock terminal of which receives a pulse corresponding to the rising/falling pulse of the signal ABN output by the pulse generating circuit 23. This flip-flop 25 detects the generation and/or the termination of the signal ABN when the periodic pulse train SA is in the "H" level state, and outputs a demand signal for selecting the output of the S/H circuit B 3.

The reference numeral 26 denotes a D-type flip-flop, the D terminal of which receives the periodic pulse train SB, the clear terminal of which receives a signal $\overline{SHB}$ inverted by an inverter 27, and the clock terminal of which receives the signal ABN. This flip-flop 26 temporarily memorizes therein that an abnormality has occured in the error signal when the periodic pulse train SB is in the "H" level state. The reference numeral 28 designates a two-input AND circuit for gating the demand signal output by the D-type flip-flop 25 by information temporarily memorized by the D-type flip-flop 26. In the circuit of the present embodiment, the D-type flip-flops 25 and 26, the inverter 27 and the two-input AND circuit 28 together constitute the monitoring circuit A 11.

On the other hand, the reference numeral 29 denotes a D-type flip-flop, the D terminal and the clear terminal of which receive the periodic pulse train SB is input and to the clock terminal of which receives a pulse corresponding to the rising/falling pulse of the signal ABN output by the pulse generating circuit 23. This flip-flop 29 detects the generation and/or termination of the signal ABN when the periodic pulse train SB is in the "H" level state, and outputs a demand signal for selecting the output of the S/H circuit A 2.

The reference numeral 30 designates a D-type flip-flop the D terminal of which receives the periodic pulse train SA, the clock terminal of which receives the signal ABN, and the clear terminal of which receives a sample hold signal $\overline{SHA}$ inverted by an inverter 31. This flip-flop 30 temporarily memorizes therein that an abnormality has occurred in the error signal when the periodic pulse train SA is in the "H" level state.

The reference numeral 32 denotes a two-input AND circuit for gating the demand signal output by the D-type flip-flop 29 by information temporarily memorized by the D-type flip-flop 30. In the circuit of the present embodiment, the D-type flip flops 29 and 30, the inverter 31 and the two-input AND circuit 32 together constitute the monitoring circuit B 12. The reference numeral 33 designates an RS-type flip-flop set by the output signal PA of the gate portion 28 and reset by the output signal PB of the gate portion 32. This flip-flop 33 outputs the selection signal A/B of the sample hold circuits.

Figure 9:
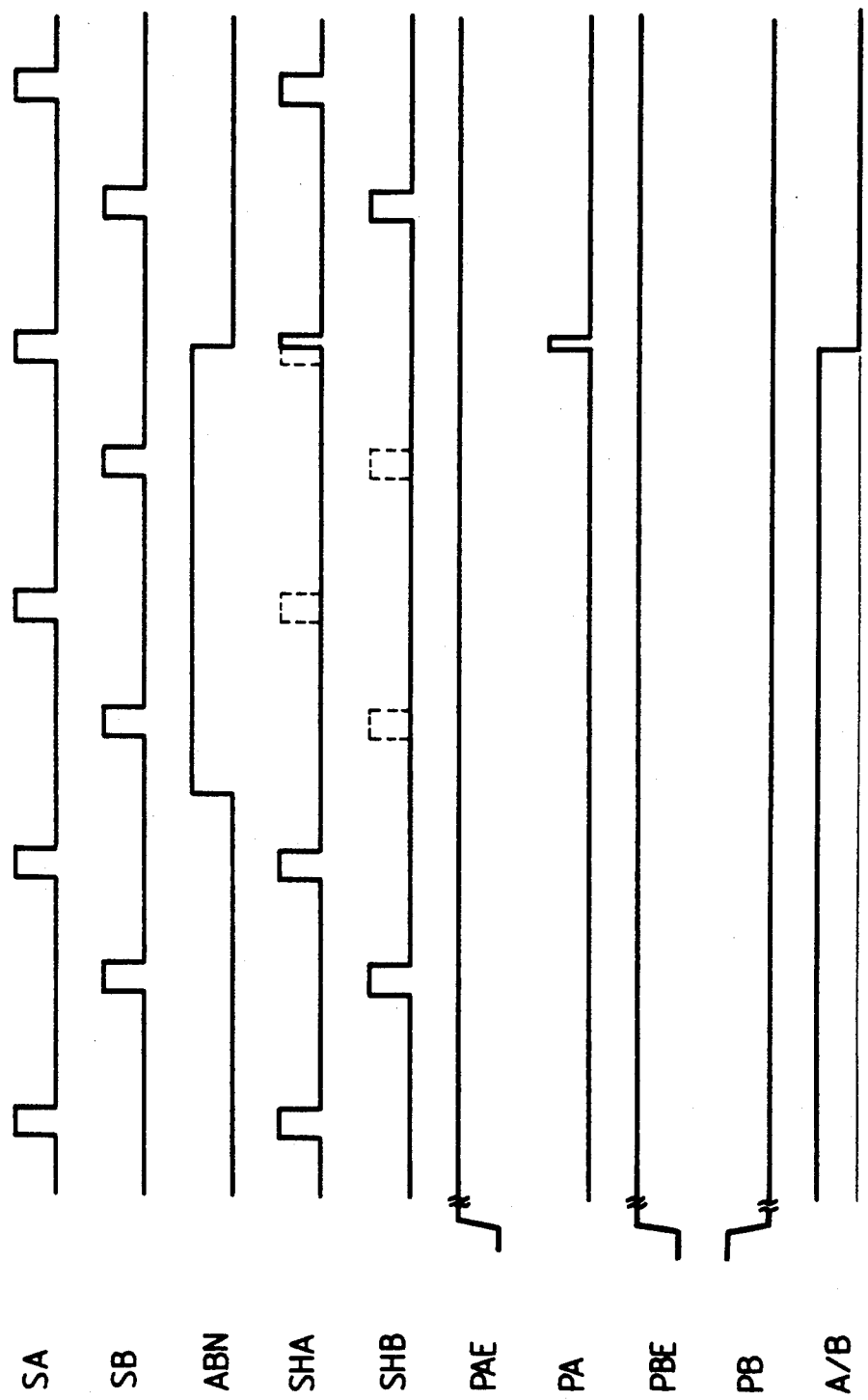
FIGS. 9 to 11 are timing charts showing signal waveforms in the various portions shown in FIG. 8.
Figure 10:
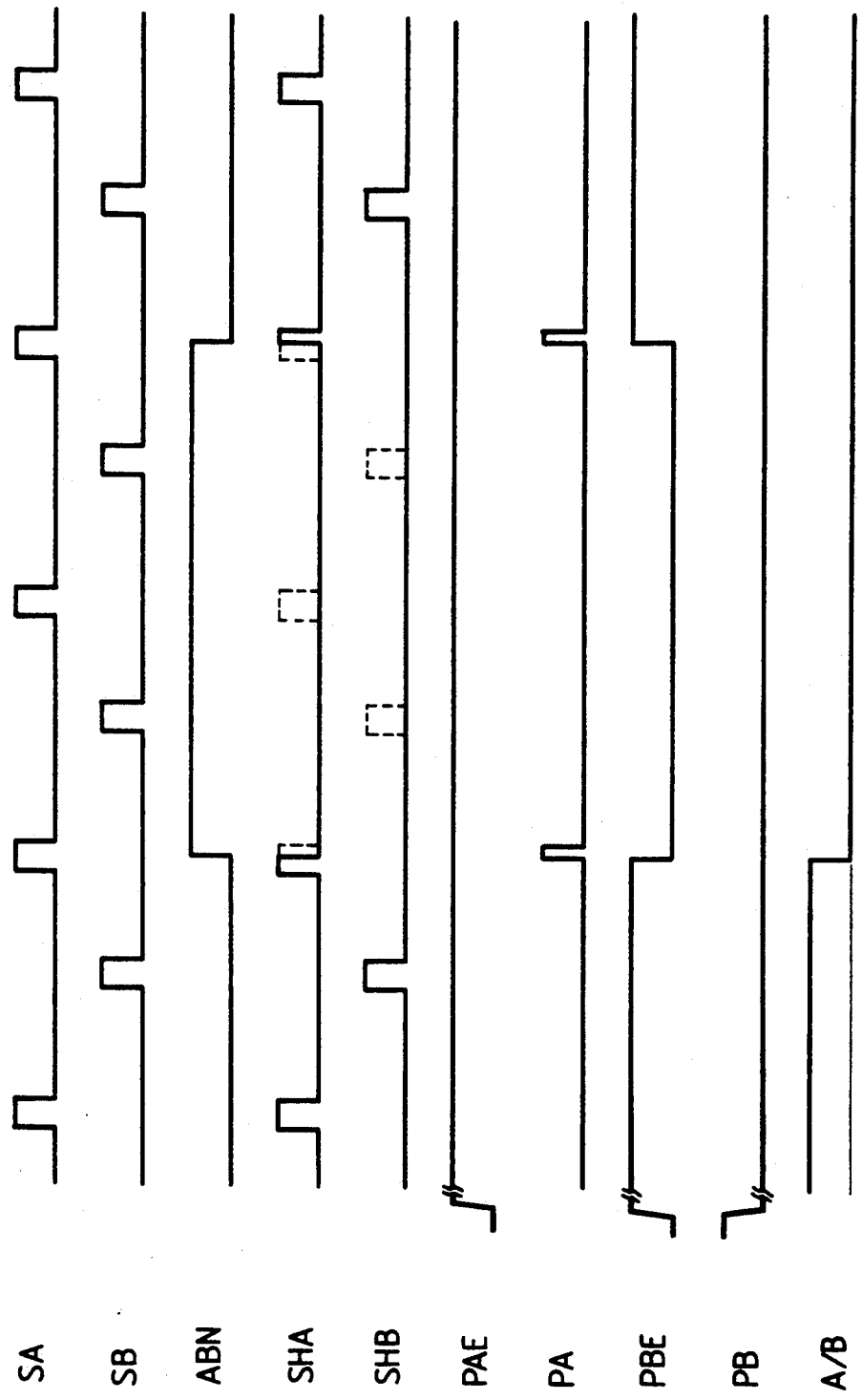
Figure 11:
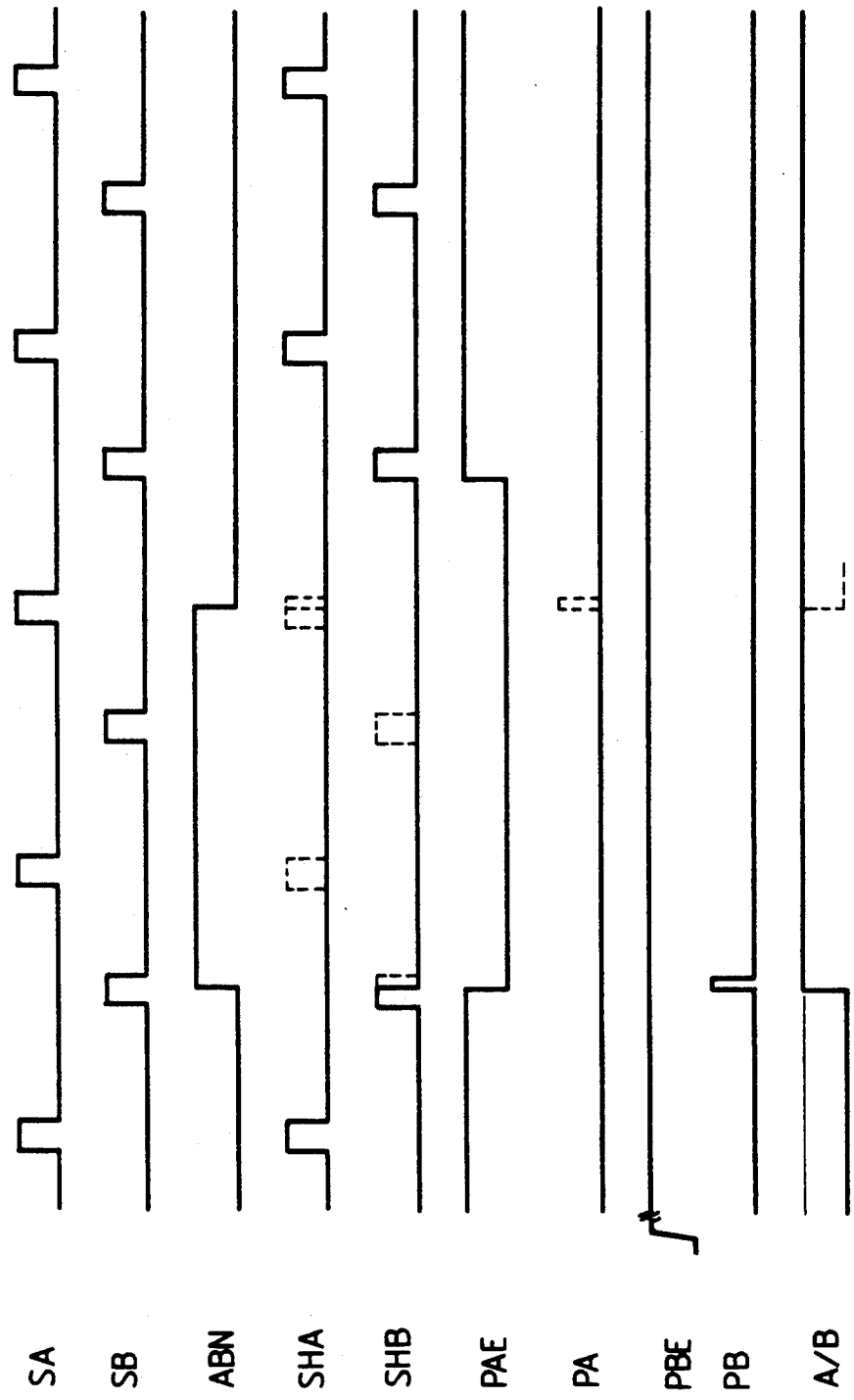

FIGS. 9 to 11 are timing charts showing the timing at which the abnormality of the error signal occurs for the periodic pulse trains SA and SB and the timing until the selection signal A/B is generated, and only representative signals are shown in these figures.

First, FIG. 9 shows the case where the abnormality occurrence detection signal ABN is generated during the second holding period of the periodic pulse train SA (the "L" level period from after the second pulse of the periodic pulse train SA of FIG. 9 is generated until the third pulse is generated) and the first holding period of the periodic pulse train SB, and terminates during the generation of the fourth pulse of the periodic pulse train SA (the "H" level period of the fourth pulse of FIG. 9). In the circuit shown in FIG. 8, until the signal ABN rises to the "H" level, that is, during the period for which the abnormality of the error signal is not detected, there is no clock input to the D-type flip-flops 26 and 30 and the signals SHA and SHB are output as will be described later and the inverted signal is input to the clear terminal and therefore, each $\overline{Q}$ output assumes the "H" level.

The output of the inverter 24 is also at the "H" level and the gates 21 and 22 constituting the S/H enabling circuit 10 become open, and the periodic pulse trains SA and SB are imparted as sample hold signals SHA and SHB, respectively, to the S/H circuit A 2 and the S/H circuit B 3. In each sample hold circuit, the same error signal is sampled when it is at the "H" level at different phase timings, and the holding operation is performed at the "L" level. On the other hand, the D-type flip-flops 25 and 29 have no clock input thereto and are cleared by periodic pulse trains $\overline{SA}$ and $\overline{SB}$ and therefore, the Q output assumes the "L" level. Therefore, the outputs of the gates 28 and 32 are at the "L" level. Accordingly, the state of the RS-type flip-flop 33 does not change, but continues to keep an output of the "H" level or "L" level selected before.

Next, when an abnormality of the error signal is detected and the signal ABN assumes the "H" level, the periodic pulse trains SA and SB are being held at the "L" level, and a pulse corresponding to the rising of the signal ABN is input as a clock signal to the rising/falling detecting D-type flip-flops 25 and 29 with the input to the D terminals thereof being at the "L" level state and therefore, in this case, the Q output continuedly outputs a signal of the "L" level. On the other hand, in the gates 21 and 22 constituting the S/H enabling circuit 10, the periodic pulse trains SA and SB are not allowed to pass therethrough during this period until the signal $\overline{ABN}$ inverted by the inverter 24 assumes the "L" level and the error signal is no longer in an abnormal state. That is, the second pulse of the sample hold signal SHA of FIG. 9 and the second and third pulses (the pulses depicted by broken lines) of the sample hold signal SHB are erased. Thus, during the period for which the signal ABN is at the "H" level, both of the S/H circuit A 2 and the S/H circuit B 3 continue their holding state. Likewise, neither of the D-type flip-flops 26 and 30 effects a state transition. In addition, the RS-type flip-flop 33 does not effect a state transition because the signals PA and PB are not generated in this section.

Next, when the abnormality of the error signal ends and the signal ABN assumes the "L" level, the periodic pulse train SB is being held at "L" level and as previously described, the state of the rising/falling detecting D-type flip-flop 29 does not change. However, the periodic pulse train SA is in the "H" level state, and the input to the D terminal of the D-type flip-flop 25 becomes "H" and at this time, a pulse corresponding to the falling of the signal ABN is output from the pulse generating circuit 23 and input to the clock terminal. Thus, the Q output of the D-type flip-flop 25 assumes the "H" level (because the periodic pulse train SA is input to the clear terminal) and the pulse output continues until the periodic pulse train SA assumes the "L" level. Also, the D-type flip-flops 26 and 30 experience no transition of their state because they have no clock pulse input thereto, and the $\overline{Q}$ outputs PAE and PBE thereof remain at the "H" level. Accordingly, the gates 28 and 32 are open and the "H" pulse of the D-type flip-flop 25 is output as a signal PA from the gate 28 to cause the output of the RS type flip-flop 33 to assume the "L" level. As a result, the output of the S/H circuit B 3 is selected.

FIG. 10 shows a case where an abnormality of the error signal occurs during the generation of the second pulse of the periodic pulse train SA (i.e., during the sampling by the S/H circuit A 2) and terminates during the generation of the fourth pulse.

The signal ABN assumes the "H" level and the process is the same as described with reference to FIG. 9 and therefore need not be described.

When an abnormality of the error signal is detected and the signal ABN assumes the "H" level, the periodic pulse train SB is at the "L" level and the S/H circuit B 3 is in its holding state, and as described in connection with FIG. 9, the input to the D terminal of the D-type flip-flop 29 is "L" and therefore this flip-flop continuedly outputs an "L" output and the transition of the state thereof does not take place. On the other hand, the input to the D terminal of the D-type flip-flop 25 is "H" and a clock corresponding to the rising of the signal ABN is input to this flip-flop and therefore, the same pulse as the signal PA shown in FIG. 10 is generated. The output pulse is generated in the time section from after the signal ABN has risen until the flip-flop 25 is cleared by the "L" level portion of the periodic pulse SA. Also, the input to the D terminal of the D-type flip-flop 26 is "L" and therefore, this flip-flop continuedly outputs an "H" output and the transition of the state thereof does not take place. Further, the input to the D terminal of the D-type flip-flop 30 is at the "H" level and the rising clock of the signal ABN is input to this flip-flop, and the $\overline{Q}$ output PBE thereof assumes the "L" level. Accordingly, the gate 28 becomes open and outputs a pulse signal PA, and the gate 29 becomes closed. Therefore, the RS-type flip-flop assumes the "L" level independently of the "H" level or the "L" level output hitherto, and selects the output of the S/H circuit B 3.

Next, during the period for which the abnormality detection signal ABN is "H", the gates 21 and 22 are rendered closed and therefore, the sample hold signals SHA and SHB of FIG. 10 have their pulse regions which are indicated by broken lines erased.

Next, when the abnormality in the error signal ends and the signal ABN assumes the "L" level, the periodic pulse train SB is in the holding state ("L" level) and the states of the D-type flip-flops 26 and 29 do not change. The D-type flip-flop 30 has no rising clock input thereto, but the sample hold signal SHA, though imperfect in its pulse width, is output as the output of the gate 21, and clears the flip-flop 30 through the inverter 31. Therefore, the $\overline{Q}$ output PBE changes to the "H" level.

On the other hand, the input to the D terminal of the D-type flip-flop 25 is "H" and a pulse corresponding to the falling pulse of the signal ABN is input as a clock thereto and therefore, there is generated the second pulse of the signal PA shown in FIG. 10 (the output pulse disappears in the "L" level section of the periodic pulse SA). Accordingly, the gate 32 is closed because the $\overline{Q}$ output of the D-type flip-flop 29 continuedly outputs an "L" level signal, and the gate 28 is open and outputs a pulse PA because the signal PAE is "H". However, since the RS-type flip-flop is already set to an "L" output, the transition of the state thereof does not take place.

FIG. 11 shows a case where an abnormality in the error signal occurs during the generation of the first pulse of the periodic pulse train SB (i.e., during the sampling operation of the S/H circuit B 3) and terminates during the generation of the third pulse of the periodic pulse train SA.

The process is performed in the circuit shown in FIG. 8, the abnormality occurs in the error signal and the signal ABN assumes the "H" level; such a process is the same as described with reference to FIG. 9 and need not be described here.

Now, when an abnormality in the error signal is detected and the signal ABN assumes the "H" level, the periodic pulse train SA is at the "L" level and the S/H circuit A 2 is in its holding state, and the inputs to the D terminals of the D-type flip-flops 25 and 30 are "L" and therefore, the transition of the states of these flip-flops does not take place. That is, the output of the D-type flip-flop 25 maintains the "L" level and the $\overline{Q}$ output PBE of the D-type flip-flop 30 maintains the "H" level. Also, the inputs to the D terminals of the D-type flip-flops 26 and 29 are at the "H" level, and the $\overline{Q}$ output PAE of the D-type flip-flop 26 assumes the "L" level, and the D-type flip-flop 29 generates a pulse, not shown, at the same time as the pulse shown in the signal PB of FIG. 10, from the rising of the signal ABN until the flip-flop 29 is cleared by the "L" level of the periodic pulse train SB. Accordingly, the signal PAE assumes the "L" level and the input end of the gate 28 becomes closed, and the output signal PA remains at the "L" level. Also, since the signal PBE remains at the "H" level, the input end of the gate 32 is open and outputs the output pulse of the D-type flip-flop 29 as an output signal PB. Thus, the RS-type flip-flop 33 renders the selection signal A/B as the output signal into the "H" level irrespective of its state hitherto.

Subsequently, the gates 21 and 22 are rendered closed during the period for which the abnormality detection signal ABN is "H", and the "H" level of the sample hold signals SHA and SHB is deleted and the S/H circuit A 2 and the S/H circuit B 3 are brought into their holding state.

Next, the timing at which the abnormality of the error signal is ended and the signal ABN assumes the "L" level is the same as the case of FIG. 10, but the circuit operation differs. This is attributable to the fact that in the case of FIG. 10, the abnormality of the error signal occurs at the "H" level of the periodic pulse train SA and in FIG. 11, it occurs at the "H" level of the periodic pulse train SB. That is, when the signal ABN assumes the "L" level, the periodic pulse train SB is at the "L" level and the input to the D terminal of the D-type flip-flop 29 is "L", and the transition of the state does not take place. As regards also the D-type flip-flop 30, no rising clock is input thereto and therefore, the $\overline{Q}$ output PBE thereof remains at the "H" level. On the other hand, a rising clock is neither input to the D-type flip-flop 26 and a signal $\overline{SHB}$ inverted by the inverter 27 is connected to the clear terminal of this flip-flop and is at the "H" level and therefore, the output PAE remains at the "L" level. Therefore, the gate 21 maintains its closed state. (The gate 22 becomes open because the signal $\overline{ABN}$ inverted by the inverter 24 assumes the "H" level and the $\overline{Q}$ output PBE of the D-type flip-flop 30 remains at the "H" level.)

In the case of FIG. 10, the signal PA indicated by broken line in FIG. 11 is pulse-output, whereas in the case of FIG. 11, the gate 21 is closed and the third pulse of the sample hold signal SHA is completely deleted. That is, since the abnormality of the sampling by the selected sample hold circuit (in this case, the S/H circuit B 3) is temporarily memorized during the change-over of the selection signal, an operation is performed so that selection of a wrong sample hold circuit (indicated by broken line in FIG. 11 A/B) may not be executed. At the same time, an operation is performed so as not to cause the abnormality of the sampling by the sample hold circuit from being selected (in this case, the S/H circuit A 2). The D-type flip-flop 26 is cleared by the inverted output $\overline{SHB}$ of the sample hold signal SHB output from the gate 22 which has become open after the abnormality has been released ended, restores its $\overline{Q}$ output PAE to the "H" level, restores the gate 21 to its open state, and returns to its normal operation.

Also, FIGS. 9 to 11 are shown as typical examples because a similar operation is performed even if the timing of the generation of the abnormality detection signal ABN relative to the periodic pulse trains SA and SB becomes opposite between the A system and the B system.

While an embodiment of the present invention has been described above, the constructions of the circuits and the behaviors, polarities, etc. of the signals are not restricted to those described above.

For example, the S/H enabling circuit, instead of being constructed of gate logic, may be constructed so as to stop the generation of the periodic pulse trains.

Figure 12:
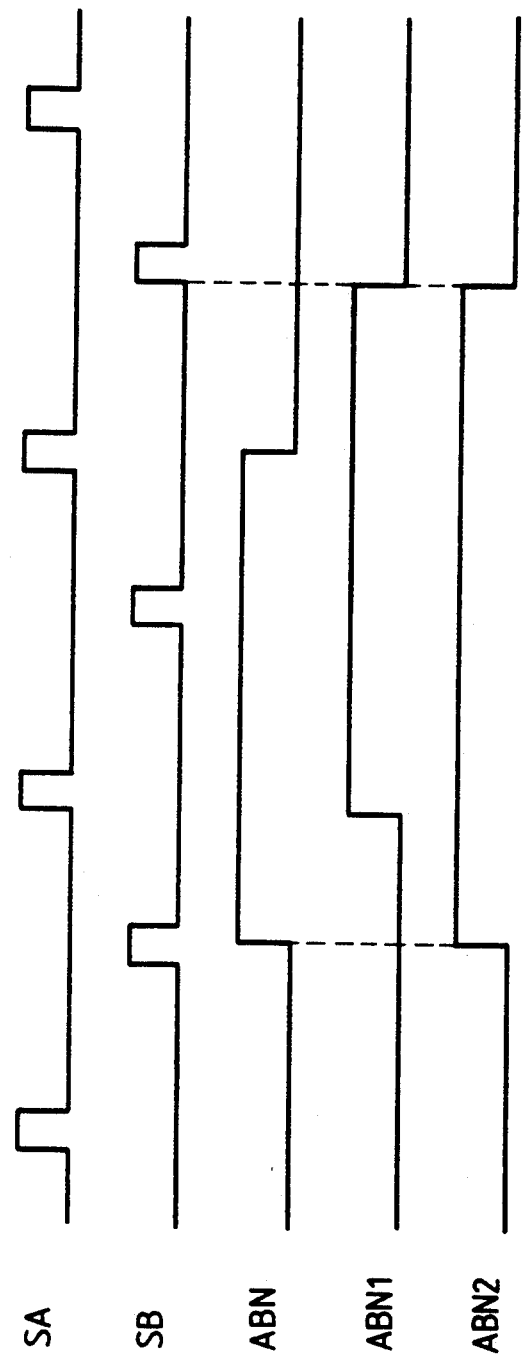
FIG. 12 is a timing chart showing signal waveforms in a modification of the present invention.

Also, as shown in FIG. 12, the times of generation and termination of the abnormality detection signal ABN of the error signal may be synchronized with the timing of the periodic pulse trains or the like so that the sampling operation by an incomplete sampling pulse may not be started.

In FIG. 12, SA, SB and ABN represent the same signals as the signals already described, ABN1 represents the Q output of a D-type flip-flop to the D terminal of which the signal ABN is input and to the clock terminal of which the logic sum of the periodic pulse trains SA and SB are input, ABN2 represents the logic sum of the signal ABN and the signal ABN1, and the rear edge is synchronized with the fore edge of the periodic pulse train SA or SB. Preferably, the design may be made such that the signal ABN2 is made to fall before the start of the sampling by the timing pulses forming the same periodic pulse train.

I claim:

1. An optical information recording-reproducing apparatus comprising:
    means for effecting recording and/or reproduction of information by scanning a recording medium with a light beam;
    control means for effecting auto focusing control of said light beam;
    a focusing error signal detecting circuit for detecting a focusing error signal which is supplied to said control means;

first and second sample hold circuits which are connected in parallel to each other and into each of which said focusing error signal is inputted, said first and second sample hold circuits alternately sampling the inputted focusing error signal during a predetermined period and a first and second sample hold signal being outputted from each of said first and second sample hold circuits, respectively;

an abnormality detecting circuit for detecting an abnormality of said focusing error signal and outputting an abnormality detection signal;

a judging circuit for controlling said first and second sample hold circuits so as to suspend the sampling for a period of time during which said abnormality detection signal is inputted to said judging circuit; and a selector for, when an abnormality is detected, selectively switching from supplying to said control means the sample hold signal outputted from the sample hold circuit which is sampling at the time the abnormality is detected to the sample hold circuit which was sampling at a time before the abnormality occurred and was detected.

2. An optical information recording-reproducing apparatus according to claim 1, wherein said abnormality detecting circuit outputs said detection signal when said focusing error signal assumes a level outside a predetermined allowable range.

3. An optical information recording-reproducing apparatus according to claim 1, wherein said means for effecting recording and/or reproducing comprises a light source emitting a light beam, and a lens for condensing the light beam emitted from said light source on the recording medium.

4. An optical information recording-reproducing apparatus according to claim 3, wherein said control means moves said lens relative to said recording medium.

5. An optical information recording-reproducing method, comprising the steps of;

effecting recording of information and/or reproduction of information by scanning a recording medium with a light beam;

detecting a focusing error signal associated with the light beam;

alternately sampling the focusing error signal during a predetermined period and generating first and second sample hold signals;

detecting an abnormality of the focusing error signal with a detecting circuit and outputting an abnormality detecting signal from the detecting circuit when an abnormality of the focusing error signal is detected by the detecting circuit;

suspending the sampling for a period of time during which the abnormality detection signal is outputted;

selecting, when an abnormality is detected, the sample hold signal obtained by the sampling at a time before the abnormality occurred and was detected; and performing auto focusing control of the light beam in accordance with the selected sample hold signal.

6. A method according to claim 5, wherein said abnormality detection signal is outputted from the detecting circuit when the focusing error signal assumes a level outside a predetermined range.

7. An optical information recording-reproducing apparatus comprising:

means for effecting recording and/or reproduction of information by scanning a recording medium with a light beam;

control means for effecting auto tracking control of said light beam;

a tracking error signal detecting circuit for detecting a tracking error signal which is supplied to said control means;

first and second sample hold circuits which are connected in parallel to each other and into each of which said tracking error signal is inputted, said first and second sample hold circuits alternately sampling the inputted tracking error signal during a predetermined period and a first and second sample hold signal being outputted from each of said first and second sample hold circuits, respectively;

an abnormality detecting circuit for detecting an abnormality of said tracking error signal and outputting an abnormality detection signal;

a judging circuit for controlling said first and second sample hold circuits so as to suspend the sampling for a period of time during which said abnormality detection signal is inputted to said judging circuit; and a selector for, when an abnormality is detected, selectively switching from supplying to said control means the sample hold signal outputted from the sample hold circuit which is sampling at the time the abnormality is detected to the sample hold circuit which was sampling at a time before the abnormality occurred and was detected.

8. An optical information recording-reproducing apparatus according to claim 7, wherein said abnormality detecting circuit outputs said detection signal when said tracking error signal assumes a level outside a predetermined allowable range.

9. An optical information recording-reproducing apparatus according to claim 7, wherein said means for effecting recording and/or reproducing comprises a light source emitting a light beam, and a lens for condensing the light beam emitted from said light source on the recording medium.

10. An optical information recording-reproducing apparatus according to claim 9, wherein said control means moves said lens relative to the recording medium.

11. An optical information recording-reproducing method, comprising the steps of:

effecting recording of information and/or reproduction of information by scanning a recording medium with a light beam;

detecting a tracking error signal associated with the light beam;

alternately sampling the tracking error signal during a predetermined period and generating first and second sample hold signals;

detecting an abnormality of the tracking error signal with a detecting circuit and outputting an abnormality detecting signal from the detecting circuit when an abnormality of the tracking error signal is detected by the detecting circuit;

suspending the sampling for a period of time during which the abnormality detection signal is outputted;

selecting, when an abnormality is detected, the sample hold signal obtained by the sampling at a time before the abnormality occurred and was detected; and performing auto focusing control of the light beam in accordance with the selected sample hold signal.

12. A method according to claim 11, wherein said abnormality detection signal is outputted from the detecting circuit when the tracking error signal assumes a level outside the predetermined range.

* * * * *

UNITED STATES PATENT AND TRADEMARK OFFICE
CERTIFICATE OF CORRECTION

PATENT NO. : 5,235,580            Page 1 of 2

DATED : August 10, 1993

INVENTOR(S) : YASUO OGINO

It is certified that error appears in the above-indentified patent and that said Letters Patent is hereby corrected as shown below:

ON THE COVER PAGE AT [57]

IN THE ABSTRACT

Line 4, "controller" should read --a controller--.
    Line 11, "of" should be deleted.

COLUMN 1

Line 24, "spot, " should read --spot--.
    Line 25, "medium" should read --medium,--.

COLUMN 4

Line 4, "flaw" should read --a flaw--.
    Line 28, "other" should read --another--?

COLUMN 7

Line 35, "which" should be deleted.

COLUMN 8

Line 39, "SB is input" should read --SB,--
    Line 40, "to" should be deleted.
    Line 48, "flop" should read --flop,--.
    Line 59, "flip flops" should read --flip-flops--.

UNITED STATES PATENT AND TRADEMARK OFFICE
CERTIFICATE OF CORRECTION

PATENT NO. : 5,235,580
DATED : August 10, 1993
INVENTOR(S) : YASUO OGINO

It is certified that error appears in the above-indentified patent and that said Letters Patent is hereby corrected as shown below:

COLUMN 12

Line 24, "released" should be deleted.

COLUMN 13

Line 35, "said" (second occurence) should read --the--.
Line 38, "of;" should read --of:--.

Signed and Sealed this

Twenty-ninth Day of March, 1994

Attest:

BRUCE LEHMAN

*Attesting Officer*   *Commissioner of Patents and Trademarks*